May 6, 1924.
M. WASSERMAN
1,493,303
MEASURING AND FILLING MACHINE
Filed Aug. 9, 1922
2 Sheets-Sheet 2
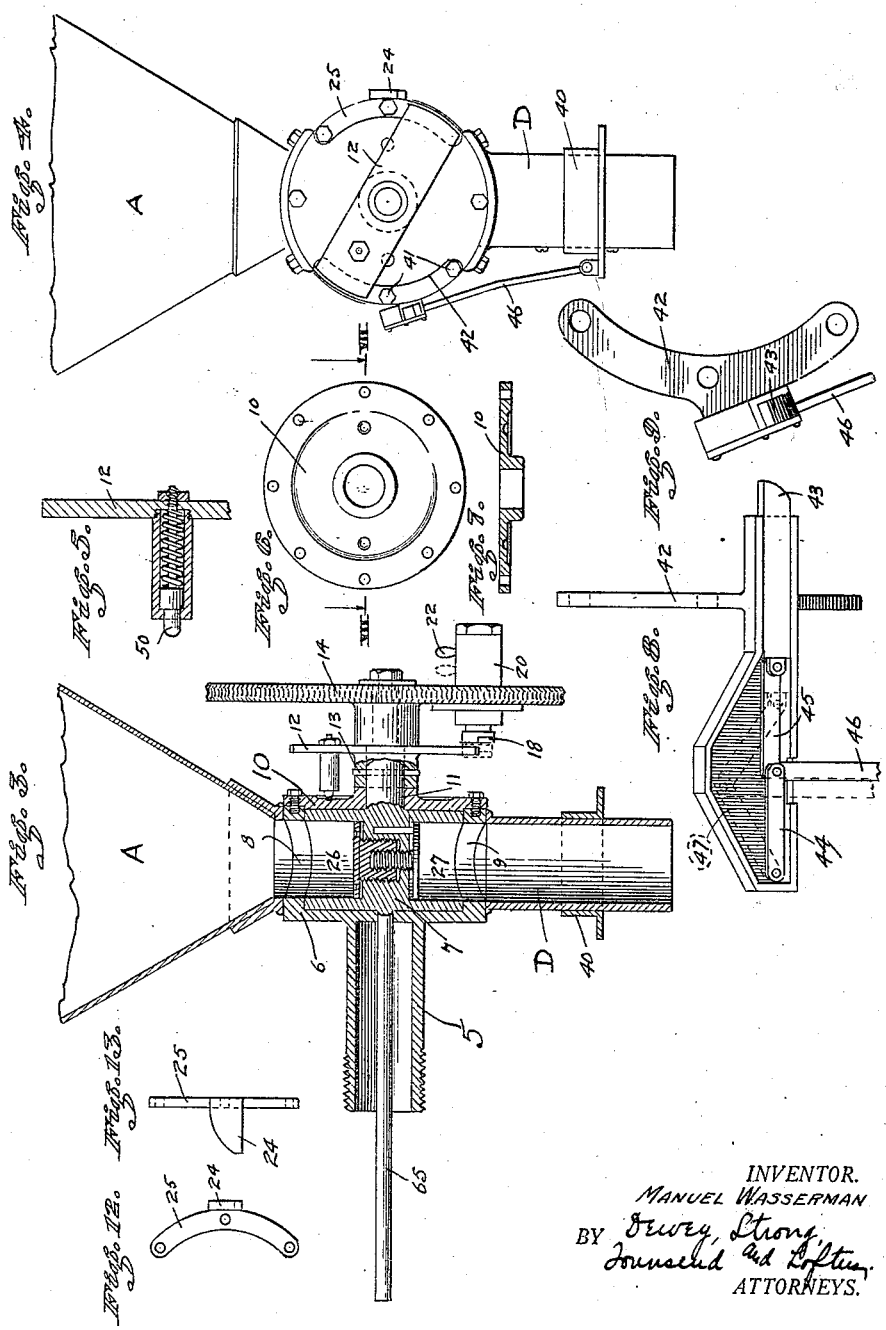
INVENTOR.
MANUEL WASSERMAN
BY Dewey, Strong,
Townsend and Loftus
ATTORNEYS.

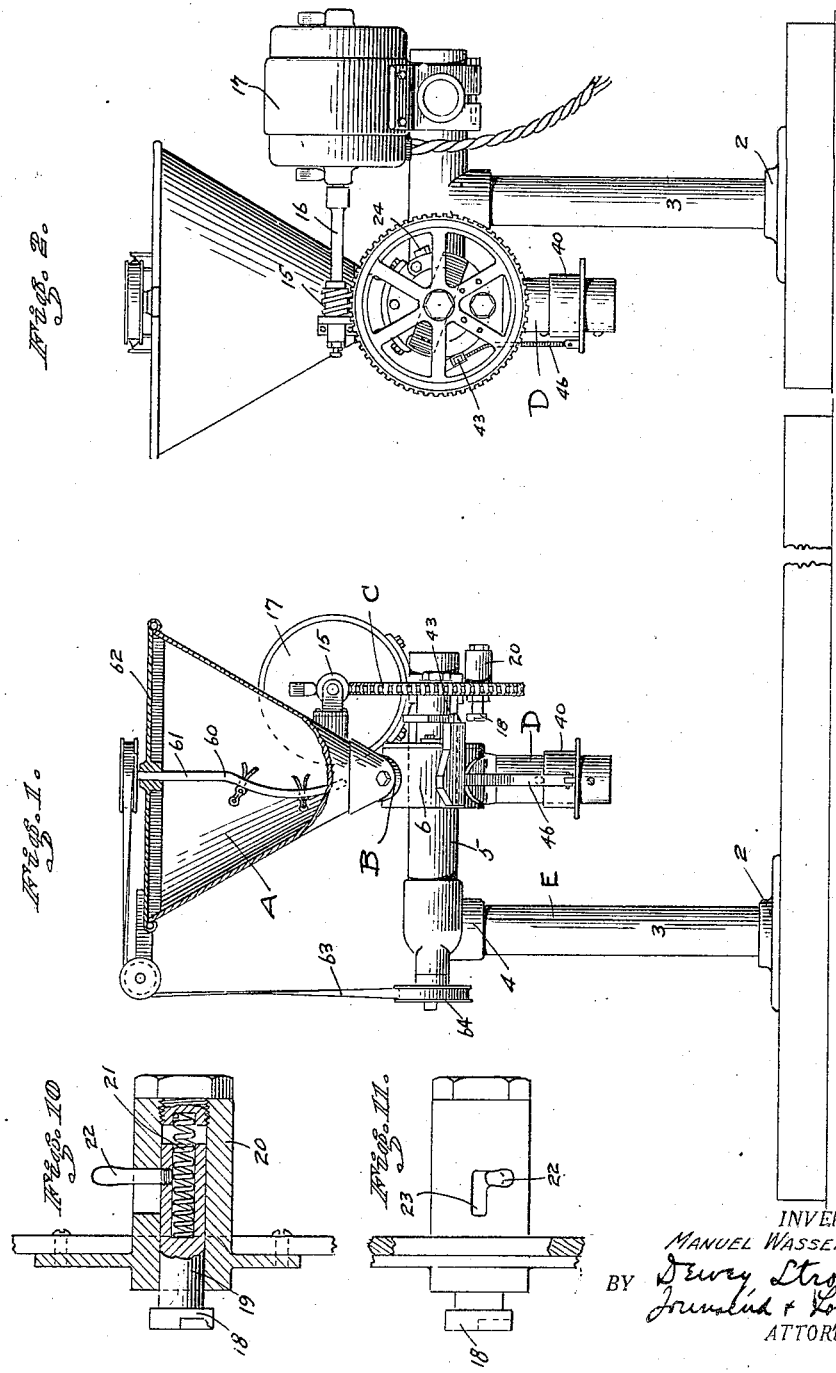

Patented May 6, 1924.

1,493,303

UNITED STATES PATENT OFFICE.

MANUEL WASSERMAN, OF DEL MONTE, CALIFORNIA.

MEASURING AND FILLING MACHINE.

Application filed August 9, 1922. Serial No. 580,608.

*To all whom it may concern:*

Be it known that I, MANUEL WASSERMAN, a citizen of the United States, residing at Del Monte, county of Monterey, and State of California, have invented new and useful Improvements in Measuring and Filling Machines, of which the following is a specification.

This invention relates to a combined measuring and filling machine, and especially to a machine whereby small bags may be rapidly filled with measured quantities of tea or the like.

The object of the present invention is to generally improve and simplify machines of the character described; to provide a rotary measuring head connected with a hopper or other source of supply on one side and a discharge or bag receiving spout on the other side; and further to provide a continuous driving member and means cooperating therewith whereby a one-half revolution will be intermittently transmitted to the measuring head once during each revolution of the continuous driving member, said cooperating means being manually actuated so that the rotary measuring head will only be rotated when bags are placed on the spout. Other objects will hereinafter appear.

One form which my invention may assume is exemplified in the following description and illustrated in the accompanying drawings, in which—

Fig. 1 is an end view of the measuring and filling machine, said view being partially in section.

Fig. 2 is a side elevation thereof.

Fig. 3 is an enlarged detail view in section showing the measuring head and the mechanism for intermittently rotating the same.

Fig. 4 is a detail end view of the measuring head.

Fig. 5 is a sectional detail view of the detent.

Fig. 6 is a front view of the head which secures the measuring head in position.

Fig. 7 is a transverse section of the head taken on line 7—7, Fig. 6.

Fig. 8 is a side elevation of the manually actuated latch.

Fig. 9 is an end view of the same showing the bracket whereby it is attached to the machine.

Fig. 10 is a sectional detail view of the driving lug.

Fig. 11 is a plan view of the same.

Figs. 12 and 13 are side and end views respectively of the automatic releasing latch.

The machine forming the subject matter of the present application embodies a hopper A, a measuring mechanism B, a driving mechanism generally indicated at C, a discharge or filling spout D, and a stand E of suitable construction whereby the machine as a whole is supported. The stand proper consists of a base section 2, a tubular upright 3, and a fitting 4, in which is secured a sleeve member 5, forming a part of the cylinder 6 in which is turnably mounted a measuring head 7. The cylinder 6 has an inlet opening 8 formed in its upper end and a discharge opening 9 formed in its lower end. One side of the cylinder is open and the measuring head is inserted or removed through this opening, the measuring head being secured in position when inserted by means of a head member 10, details of which are shown in Figs. 3, 6 and 7, this head being in turn secured by bolts or any other suitable means as illustrated.

The head member 10 serves two functions, first that of a retainer for securing the measuring head against endwise movement when in position within the cylinder, and secondly that of a bearing for the driving mechanism generally indicated at C, that is, a shaft 11 is here shown as forming an integral part of the measuring head. This shaft extends through a bearing formed in the head 10 and it carries a driving arm 12, which is keyed or pinned thereto as indicated at 13. The outer end of the shaft is reduced in diameter and carries a worm gear 14, which is driven by means of a worm pinion 15 secured on the shaft 16 of an electric motor 17, said member being also supported by the stand generally indicated at E. The worm gear is freely turnable on the shaft 11 but means are provided for transmitting an intermittent turning movement to the shaft 11 and the measuring head carried thereby. The means employed comprises a driving latch 18, see Figs. 1, 3, 10 and 11. This latch is indicated at 18 and is secured on the outer end of a bolt or pin 19 which is slidably mounted in a pinion gear 20 secured to one of the spokes of the worm gear 14. A spring 21 normally maintains the bolt and the latch 18 in a projected position, but the bolt and latch may be manually retracted and held in retracted position by means of a pin 22 which projects through an L-shaped slot 23 formed in the bushing. When the latch is in retracted position, worm gear 14 will freely rotate and no power will be transmitted to the measuring head. If it is desired to intermittently rotate the measuring head, latch 18 is released by swinging the pin 22 into alignment with the straight portion of the slot 23. The spring 21 will then project the bolt and the latch and they will remain in this projected position until manually retracted.

As previously stated shaft 11 is provided with a driving arm 12. This arm is perhaps best illustrated in Figs. 3 and 4. The latch 18 when projected engages one end of the driving arm 12 and thereby forms a driving connection and in this manner rotates the driving arm together with the shaft 11 and the measuring head. The driving connection is however broken when a one-half revolution is imparted by an automatic releasing latch indicated at 24, see Figs. 12 and 13. This latch is secured by means of a bracket 25 to one side of the head member 10, and is so positioned that it will engage the end of the latch 18 and depress the same to such an extent that it will release the driving arm 12. The latch 18 however assumes normal position the moment latch 24 is passed and it is therefore in a position to engage the opposite end of the arm 12 when another one-half revolution has been completed. In other words with gear 14 rotating continuously, and due to the position of the latches shown at 18 and 24, a one-half revolution will be imparted to shaft 11 and the measuring head once during each revolution of the gear. This intermittent rotation of the measuring head is necessary as the measuring head is provided with two receiving or measuring pockets as indicated at 26 and 27. These pockets alternately align with the hopper A and the discharge spout D. When one of the pockets in the measuring head aligns with the hopper, filling thereof will take place, and when the head has rotated a one-half revolution, the pocket will align with the spout and will assume a vertical position, thereby permitting the contents to discharge by gravity. The next pocket will then align with the hopper and as such will fill automatically, and this will discharge during the next one-half revolution.

In actual operation it is found that an operator is not always able to keep up with the machine, that is the operator takes a bag and places the mouth of the bag over the spout. When the bag has been filled or has received its charge, it must be removed and a new bag placed in its position. A skilled operator can keep up with the machine, but even so it is necessary to stop the intermittent rotation of the measuring head from time to time as the supply of bags may run out or the operator may be interrupted or may have to stop temporarily for other reasons. A second releasing latch is therefore employed. This latch is shown in detail in Figs. 8 and 9 and is manually operated as follows:

Slidably mounted on the discharge spout D is an annular combined sleeve and collar 40, see Figs. 3 and 4, and secured to one side of the head member 10, as at 41, is a bracket 42, in which is slidably mounted a releasing latch 43. Disposed in alignment with the releasing latch is a pair of links 44 and 45. These links are centrally connected to a rod 46, which in turn is connected with the collar 40. The link 44 is pivotally connected to the housing, in which latch 43 is held, while link 45 is pivotally attached to the latch. This link connection permits retraction or projection of the latch 43, that is when the operator grasps a bag and places the mouth thereof over the spout D, the operator will at the same time lift the collar 40 in an upward direction. This movement is transmitted through rod 46 to lift the links to the dotted line position indicated at 47. The latch 43 is in this manner retracted and as such will not interfere with latch 18. Latch 18 therefore will engage the driving arm 12 and will impart a one-half revolution thereto, but if latch 43 stands in a projected position, it will engage latch 18 and depress the same at the time that it should engage the end of the driving arm 12, and it will retain the latch 18 in depressed position until arm 12 is passed. Hence if gear 14 is turning and latch 43 is projected, no movement will be transmitted to the driving arm and the measuring head, but if a bag is placed on the spout and the collar 40 is lifted, the driving engagement will be made and a one-half revolution will be imparted to the measuring head. The intermittent movement of the head is therefore under control of the operator and the movement is only transmitted when a bag is placed on the spout as it otherwise remains stationary due to the action of the latches 24 and 43.

By referring to Fig. 3, it will be noted that the pockets 26 and 27 formed in the measuring head are provided with false bottom sections and that these sections are connected by threaded extensions, one screwing into the other. These false bottom sections are provided for the purpose of increasing or decreasing the capacity of the pockets, or in other words for increasing or decreasing the quantity of tea or other material delivered to the bags. Practically any quantity desired may be obtained by properly adjusting the bottom sections.

For the purpose of insuring alignment of the pockets with the hopper and spout, respectively a detent 50 is employed. This detent is carried by the driving arm 12 and is illustrated in detail in Fig. 5. The detent engages a notch 51 in the face of the head 10 when proper alignment is obtained and as such positions the measuring head at the end of each one-half revolution.

As previously stated the machine here illustrated is particularly adapted for measuring tea and like materials. The tea is placed in the hopper A and is fed by gravity through the opening 8 into the pockets 26 and 27 when they register. Actual experience has however shown that the tea may clog and for this reason an agitating arm 60 has been employed. This arm is formed on the lower end of a shaft 61, which is journaled in the cover 62 of the hopper. A pulley is secured on the upper end of the shaft and is rotated by means of a belt 63, which is driven from a pulley 64 secured on a shaft 65 forming a part of the measuring head and rotating in unison therewith, this shaft being clearly illustrated in Fig. 3. The agitating arm 60 is in reality driven by the measuring head and as such will be intermittently rotated in unison therewith, and will for this reason agitate the tea when the head is rotating and thereby stirring it up so that it may freely fall by gravity into the measuring pockets when they align.

While I have stated that the machine is employed for the purpose of measuring tea, it is obvious that it may be employed for any other purpose desired. I similarly wish it understood that while certain features of the present invention are more or less specifically illustrated, various changes in form and proportion may be resorted to within the scope of the appended claims. Also, that the materials and finish of the several parts employed may be such as the experience and judgment of the manufacturer may dicate or various uses may demand.

Having thus described my invention, what I claim and desire to secure by Letters Patent is—

In a machine of the character described the combination with the measuring head, the cylinder enclosing the same and the discharge spout carried by said cylinder, of a shaft secured to the measuring head and extending through one side of the cylinder, a driving arm secured to said shaft, a gear turnably mounted on said shaft, means for continuously rotating the gear, a driving latch carried by the gear and adapted to engage the driving arm, a stationary latch engageable with the driving latch to automatically disengage the driving latch and the driving arm when a one-half revolution has been imparted thereto, a second latch engageable with the driving latch to prevent engagement of the driving latch and the driving arm, a collar slidably mounted on the discharge spout, and means actuated by movement of the collar for retracting or projecting the last named releasing latch.

MANUEL WASSERMAN.